United States Patent [19]

Silverman

[11] Patent Number: 5,251,326
[45] Date of Patent: Oct. 5, 1993

[54] TWO WAY COMMUNICATION SYSTEM FOR WATER SPORTS

[76] Inventor: Michael Silverman, 16410 Calahan St., Sepulveda, Calif. 91343

[21] Appl. No.: 583,435

[22] Filed: Sep. 17, 1990

[51] Int. Cl.⁵ .......................... H04B 13/02; H04B 1/38
[52] U.S. Cl. ........................................... 455/40; 455/90; 381/25; 381/151
[58] Field of Search ............... 455/89, 90, 40, 100, 455/344, 350, 351, 40; 381/25, 151; 2/338, 312, 209, 417, 425, 422

[56] References Cited

U.S. PATENT DOCUMENTS

| | | | |
|---|---|---|---|
| 3,789,166 | 1/1974 | Sebesta | 381/189 |
| 4,039,999 | 8/1977 | Weston | 455/205 |
| 4,456,797 | 6/1984 | Olsen | 381/25 |
| 4,683,587 | 7/1987 | Silverman | 381/25 |

Primary Examiner—Reinhard J. Eisenzopf
Assistant Examiner—Lisa Charouel
Attorney, Agent, or Firm—Lewis Anten

[57] ABSTRACT

A system for two way communication under shallow water or between a swimmer and observer comprising a transceiver, a wire for conducting electrical signals connected to the transceiver, a watertight transducer housing that curvedly conforms to human heads incorporating a speaker/microphone transducer in watertight connection with the wire, an adjustable strap connected to the transducer housing so that it may be attached to a portion of a human body, and a hollow acoustic transmission tube in watertight connection with the transducer housing for sound transmission to an earplug which is inserted into a human ear.

1 Claim, 1 Drawing Sheet

U.S. Patent    Oct. 5, 1993    5,251,326
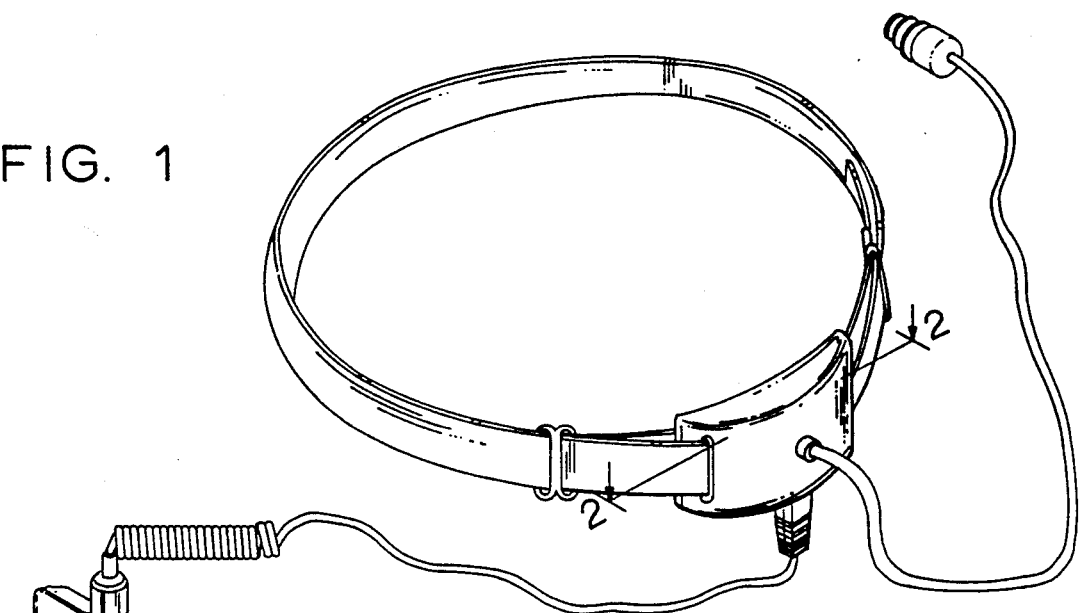
FIG. 1
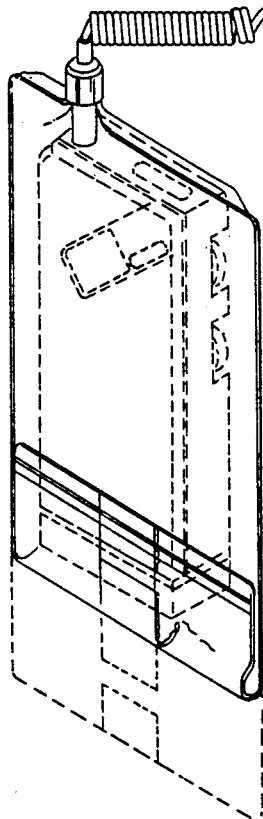
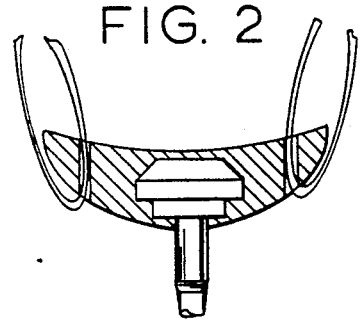
FIG. 2
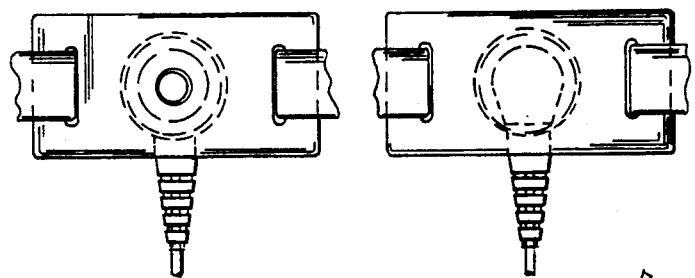
FIG. 3    FIG. 4
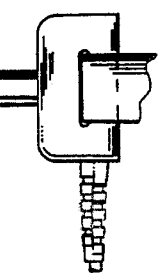
FIG. 5
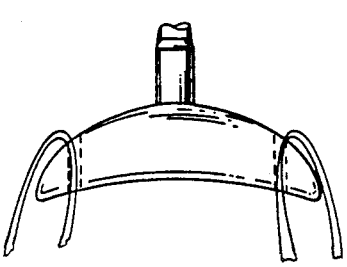
FIG. 6
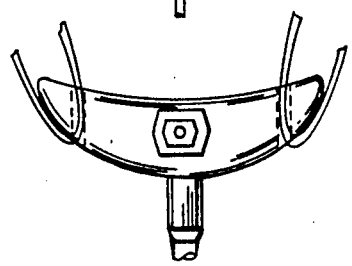
FIG. 7

TWO WAY COMMUNICATION SYSTEM FOR WATER SPORTS

BACKGROUND OF THE INVENTION

1. Field of the Invention

This invention pertains to radio communications, and more particularly with radio communications on the water or between someone in the water and someone on dry land.

2. Description of the Prior Art

In U.S. Pat. No. 4,683,587 issued to the applicant, a submersible personal stereo music system was described. The system permitted the use of a personal stereo tape cassette, such as sold by Sony under the registered trademark WALKMAN, in the water. The device consisted of a waterproof electro-acoustic transducer chamber that had its output connected by hollow tubes to music ear pieces, and its input connected to the electrical output of the Sony WALKMAN which was contained in a waterproof pouch.

Communicating with persons in or on the water proves to be difficult in many situations. Swimming coaches directing their athletes may find it hard to shout and be heard over the noise in enclosed swimming pools or when the swimmer is underwater. Surfing instructors may find the pounding surf and general ambient noise along the beach prevents their being heard by students or athletes out on the waves.

When a swimming coach instructs his pupil, the normal tendency is for the pupil to perform his strokes in the water while the coach observes and corrects the swimmer's form and performance from the side of the pool. The direct contact between the coach and swimmer leads to faster learning and greater performance on the part of the swimmer. The coach is able to direct his instructions specifically to one individual swimmer, thereby concentrating his efforts and making good use of them.

In order for the swimmer to be able to execute the instructions of his coach, the swimmer must be able to hear them. In many circumstances, the swimmer may be unable to hear his coach as the swimmer's head may be underwater or ambient noise surrounding the swimmer may prevent his hearing the coach's instructions.

Likewise, it may be beneficial for the coach to be able to hear his swimmer. Many swimmers train in, and many coaches aid their swimmers beside, large Olympic-size swimming pools. There may be occasions where the swimmer and coach are not in close proximity to one another, thereby demanding the shouting of communications between the two. Were the invention herein disclosed just a transmitter and receiver, the coach would probably be speaking normally while the swimmer would have to shout his responses across the pool. Instead, the invention contemplates the use of transceivers that both send and receive radio waves in order that both parties may communicate.

A similar situation occurs with coaching water polo. In that situation, each water polo player may wear the disclosed invention so that the coaches' directions are more easily heard and readily understood. In that case, a coach would need to address players by name, such as, "Jim, move closer to the goal and shoot!".

Swimmers and water polo players are not the only athletes that may benefit from the use of the invention disclosed herein. Surfers, windsurfers, sailors, motor boat racers, jet skiers, and water skiers all operate in or on the water and can benefit from clearer communications with "ground stations" or co-participants for the same reasons that swimmers and water polo players do. Hereinafter, when the term "user" and its derivatives are used, any appropriate user such as a swimmer is implied.

Wind surfers may have similar hearing problems as swimmers. As the windsurfer goes farther out on the water, the harder it is to hear someone on shore. New water skiers may find that their instructors, either on the beach or in the tow boat, are difficult to hear over the engine noise and water splashing that accompanies water skiing.

In competition, such as when boats or jet skis race on the water, pit crews that service the boat and driver are better able to anticipate demands and prepare remedies when communication is possible with the boat driver. The pit crew can inform the driver his relative position in the race and deliver instructions to him, as well.

Therefore, there is a need for parties to communicate with each other where one party is on the water and another party is on dry land or when both parties are in the water. The invention discloses herein a system and device for accomplishing such a task and fulfilling this need.

SUMMARY OF THE INVENTION

The invention can be described in essentially summary form as follows.

Radio transceivers are used to convey verbal messages between someone on the water and someone who is not, or between two or more parties in shallow water. One such transceiver is attached, as by a strap, to a person in or on the water. The other may be used to communicate with the person on the water by someone on dry land, such as on a beach or pool side. The transceiver is connected to a transducer housing, which in turn is connected to an earplug.

The transceiver is one of ordinary instruction already known in the art. It is kept dry and functioning by means of a waterproof barrier, such as a bag, that encapsulates the transceiver. The transducer housing contains apparatus that converts signals from the transceiver to audible signals and vice-versa.

OBJECTS OF THE INVENTION

It is an object of this invention to provide a means by which a person on or in the water may communicate with a person who is not.

It is another object of this invention to provide radio communication means for two or more parties who are in the water.

It is also an object of this invention to provide a means by which a transceiver may be electro-acoustically coupled to an earplug for use in water.

It is also an object of this invention to provide watertight means of radio communication.

These and other objects of the invention will be apparent upon review the accompanying specification and drawings.

BRIEF DESCRIPTION OF THE DRAWINGS

FIG. 1 is a perspective view of the bagged transceiver, strap, transducer housing, earplug, and the connections between these elements as disclosed by the invention.

FIG. 2 is a cutaway view along line 2—2 of FIG. 1 of the transducer housing.

FIG. 3 shows a front view of the exterior portion of the transducer housing.

FIG. 4 shows a front view of the interior, or wearer's side, of the transducer housing.

FIG. 5 shows a side view of the transducer housing.

FIG. 6 shows a top view of the transducer housing.

FIG. 7 shows a bottom view of the transducer housing.

DETAILED DESCRIPTION OF THE PREFERRED EMBODIMENT

As shown in FIG. 1, the invention comprises a transceiver 10 encased in a waterproof bag 12, a transducer housing 14 enclosing a speaker/microphone transducer 24 connected to the transceiver 10 by an electrical cord 16, a strap 18 attached to the transducer housing 14 so that it may be held in place on a human body, and an earplug 20 connected to the transducer housing 14 by a hollow tube 22. The hollow tube 22 is inserted at one end in a hole in the front of transducer housing 14 in line with the speaker portion of the speaker/microphone transducer 24. The hollow tube 22 is inserted at its other end in a hole in the earplug 20. The earplug 20 is inserted snugly into the swimmer's ear for transmission of sound to and from the transducer housing 14.

As shown in FIG. 1, the transceiver 10 is held within a waterproof bag 12 that prevents the transceiver 10 from getting wet. Preferably, the volume level of the sound received by the transceiver 10 is adjustable. All components are watertight in order to prevent malfunction, equipment damage or interference with electrical/sound transmission by the presence of water.

Watertight seals are maintained between the hollow acoustic transmission tube 22 and the transducer housing 14 as well as between the hollow acoustic transmission tube 22 and the earplug 20. In one embodiment, the earplug 20, the hollow acoustic transmission tube 22, and the transducer housing 14 are all removably attachable from one another. In another embodiment, the earplug 20 and hollow acoustic transmission tube 22 are in one piece and can be detached from the transducer housing 14. In still another embodiment, the earplug 20, hollow acoustic transmission tube 22, and the transducer housing 14 are all one piece and the hollow acoustic transmission tube 22 is not removably detachable from either the transducer housing 14 or the earplug 20.

The transducer housing 14 is watertight and made of plastic. The transducer housing 14 is curvedly conforming on an external surface to a user's body for greater comfort and enjoyment. The housing 14 encloses a speaker/microphone transducer 24 operating in a dry and watertight compartment within the transducer housing 14. The transducer housing 14 is of a size sufficient to solidly encapsulate and house the speaker/microphone transducer 24 in a watertight compartment and to provide for attachment to the electrical cord 16 from the transceiver 10 and the hollow acoustic transmission tube 22 coming from the earplug 20.

The speaker/microphone transducer 24 operates as an intermediary between the transceiver 10 and the earplug 20. When electrical signals, representing voice transmissions, are sent by the transceiver 10 to the speaker/microphone transducer 24, the speaker/microphone transducer 24 then operates as a regular, but very small, speaker. The electrical impulses sent by the transceiver 10 are converted into sound by the speaker/microphone transducer 24. The sound created is then conducted from the transducer housing 14, through the connected hollow acoustic transmission tube 22 and onto the earplug 20. The earplug 20 then transmits the sound to the ear.

In operation, the end of the earplug 20 that is inserted into the user's ear is open to the surrounding air so that the sound created by the transducer housing 14 may be conducted to the user's ear. As the earplug 20 is open, it is possible, but unlikely due to capillary action, for water to seep in past the seal that the earplug 20 creates with the inner surface of the ear. However, so long as any seepage is not too great, performance of the invention in conducting sound is not inhibited. If the seepage is too great, the earplug 20 should be removed from the ear of the user, any water that has entered the tube 22 removed by suction or pressure, and then reinserted into the user's ear.

Water seepage is not a great concern due to prior art invented by applicant and applicable to an open-ended earplug. In U.S. Pat. No. 4,683,587, patented by Applicant, capillary action and internal air pressure are used to prevent the entry of water into an earpiece similar in construction to the one in the present invention. The physical phenemenon of capillary action occurs when a liquid of high surface tension, such as water, is in contact with a small opening such as one that could be used in the present invention. Similarly, capillary action can be used to prevent the entry of water into the earplug 20 and the hollow acoustic transmission tube 22.

Alternatively, a thin and strong membrane (not shown) can be used to seal the open end of the earplug 20 to prevent water from leaking into the earplug 20 and travelling further through the hollow tube 22 and to the transducer housing 14. The membrane flexes and vibrates much in the same manner as a human eardrum. Due to the membrane's thinness and strength, sound transmission to and from the transducer housing 14 is not inhibited while keeping the earplug 20 watertight.

The hollow acoustic transmission tube 22 should be short to facilitate the transmission of sound to and from the transducer housing 14. The hollow acoustic transmission tube 22 is watertight and resists compression. The transmission tube 22 is made of plastic and is hollow so that sound may be conducted to the earplug 20 by means of gas, namely air, contained therein.

The means of reception and conduction of sound to the user from a companion is true in the reverse for the conduction and transmission of sound by the user to the companion. Due to the inherently intimate connection of the earplug 20 with the user's ear, bones within the user's head conduct the user's voice to the earplug 20. As well as the user's bones, the user's eustachian tubes also conduct sound from the user's throat to his ear. The user's ear then vibrates and transmits sound to the earplug 20. The sound transmitted by the user's eustachian tubes are a significant, if not predominant, means of conveying the user's voice to the earplug 20. Sound created by the user is conducted by the earplug 20 and hollow acoustic transmission tube 22 to the transducer housing 14. For transmission, the earplug 20 acts as a sound gathering device for the speaker/microphone transducer 24. Sounds impressed upon the speaker/microphone transducer 24 by the earplug 20 and hollow acoustic transmission tube 22 are then converted into electrical signals and transmitted by the speaker/microphone transducer 24 along the electrical cord 16 to the transceiver 10. The speaker/microphone transducer 24 is sensitive enough to respond to the sounds impressed upon it by the user, and such speaker/microphone transducers 24 are known in the art and currently in use. Likewise, the earplug 20 and hollow acoustic transmission tube 22 preferably conduct sound well so that the speaker/microphone transducer 24 may transmit a clear signal. Upon reception of the electrical signals generated by the speaker/microphone transducer 24, the transceiver 10 then transmits the electrical signals received as radio waves back to the companion. In this manner, both the user and his companion may communicate.

The adjustable strap to which the transducer housing 14 is connected is constructed of an appropriately strong material, such as cloth or plastic, and is connected to the transducer housing 14 by means of two slots 26 as shown in FIG. 2. The two slots 26 each hold a loop of the strap 18. The ends of the strap 18 are attached to the strap 18 itself to form the loops. The ends are held in place and made adjustable by the use of sliding buckles 28.

While in a preferred embodiment of the invention uses a strap 18 to attach the transducer housing 14 to a human body, other means of attachment are sufficient so long as they are secure. The housing should not become unintentionally detached from the user while in use. Such alternative means include, but are not limited to, adhesive attachment such as tape or a strap with velcro instead of sliding buckles. Adhesive backing on the transducer housing 14 could be used as well.

The strap 18 may be attached to the wearer's head or neck, whichever is most comfortable. If attached to the head, the transducer housing 14 is preferably worn at the side or rear. If worn at the front, the hollow acoustic transmission tube 22 may be distracting or annoying. The tube 22 then runs down to the earplug 20 and the earplug 20 is inserted into the ear.

The strap 18 may also be worn about the wearer's neck. Still the transducer housing 14 is worn to the side or rear, rather than the front, as the tube 22 may still be distracting or annoying. In this case, the tube 22 then runs up to the wearer's ear and the earplug 20 is inserted therein.

The transducer housing 14 is attached to the transceiver 10 by means of a conducting wire or wires 16 encapsulated in waterproof plastic. Connecting plugs 30, 32, are at both ends of the wire or wires 16 for removable attachment to the transceiver 10 at one end and the transducer housing 14 at another. The wire 16 has an accordion-like section 34 so that slack in the wire 16 may be gathered up and out of the way of the user while allowing flexible extension thereof. The connecting plugs 30, 32, should fit very snugly and optimally form a watertight seal with the connection formed. Removable attachment is preferable as it allows more ease of use. However, permanent attachment is possible without deviating from the inventive entity hereby disclosed.

The transceiver 10 is battery powered. However, the battery (not shown) may be one that is rechargeable. When the battery runs down and is out of power, or if the transceiver 10 malfunctions, the transceiver 10 must be replaced in order for the user to hear the transmissions of the companion. Removable attachment allows the strap 18 to remain in place while the transceiver 10 can be switched with another functioning unit.

Transceivers are generally known in the art and are of a size approximately 6 inches by 2 inches by 2 inches. Adjustments for volume and frequency are relatively common for such radio devices. The use of one such transceiver, known by the registered trademark as a MAXON transceiver, is within the contemplation of this invention.

The transceiver 10 is preferably worn by the user at the small of his back so that the line 16 from the transceiver 10 to the transducer housing 14 does not obstruct movement or interfere with the user. If desired, the line 16 may be held in place by tape. The transceiver 10 is held in place by a strap or belt (not shown) that is worn by the wearer.

While the present invention has been described in regards to the embodiments described, it is recognized that the alternative embodiments of the present invention may be employed without departing from the inventive concept. One such possibility is the use of dedicated transmitters and receivers, and not transceivers, for communications.

What is claimed is:

1. An apparatus for two way communication comprising:
   a transceiver, capable of sending and receiving radio signals of voice transmissions, said transceiver impervious to water;
   a connecting line removably attachable to said transceiver, said connecting line forming a waterproof seal to said transceiver to prevent water leaking in, said connecting line capable of conducting electrical signals therethrough;
   a speaker/microphone transducer removably connected to said connecting line, said speaker/microphone transducer capable of generating both electrical and acoustic signals;
   a housing incorporating said speaker/microphone transducer in a watertight compartment, said housing having two external slots;
   an adjustable strap by which to affix said housing to a portion of a human body, said adjustable strap attached to said housing through said external slots in said housing by loops with sliding buckles;
   a hollow acoustical transmission tube connected to said housing for the transmission of acoustic signals therethrough, said hollow acoustical transmission tube being removably attachable to and forming a watertight seal with said housing; and
   an earplug for the inserting into a human ear so that acoustical signals may be conducted therethrough, said earplug removably attachable to said hollow acoustic transmission tube and forming a watertight seal therewith and with the inner surface of said human ear, said earplug also capable of conducting acoustic signals from said human ear to said hollow acoustic transmission tube.

* * * * *